US009736229B2

(12) United States Patent
Järvinen et al.

(10) Patent No.: US 9,736,229 B2
(45) Date of Patent: Aug. 15, 2017

(54) DEVICE WITH EMBEDDED NETWORK SUBSCRIPTION AND METHODS

(71) Applicant: Microsoft Technology Licensing, LLC, Redmond, WA (US)

(72) Inventors: Antti Järvinen, Espoo (FI); Juha Backman, Espoo (FI); Jussi Lokasaari, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 152 days.

(21) Appl. No.: 14/624,119

(22) Filed: Feb. 17, 2015

(65) Prior Publication Data

US 2016/0241564 A1    Aug. 18, 2016

(51) Int. Cl.
*H04L 29/08* (2006.01)
*H04W 8/18* (2009.01)
*H04W 8/20* (2009.01)
*H04L 29/06* (2006.01)

(52) U.S. Cl.
CPC .......... *H04L 67/10* (2013.01); *H04L 63/0853* (2013.01); *H04L 63/107* (2013.01); *H04W 8/18* (2013.01); *H04W 8/205* (2013.01)

(58) Field of Classification Search
CPC ......... H04W 8/20; H04W 8/205; H04W 8/14; H04W 8/18; H04W 8/183; H04W 8/245; H04W 8/28; G06K 19/145; G06K 19/14
See application file for complete search history.

(56) References Cited

U.S. PATENT DOCUMENTS

| | | | | |
|---|---|---|---|---|
| 7,178,027 | B2 | 2/2007 | Faigle | |
| 8,225,110 | B2 | 7/2012 | Stahl et al. | |
| 8,712,474 | B2* | 4/2014 | Gehrmann | H04W 8/205 455/411 |
| 9,525,999 | B2* | 12/2016 | Godfrey | H04W 12/04 |
| 2006/0236325 | A1* | 10/2006 | Rao | G06F 8/65 719/315 |
| 2008/0045177 | A1* | 2/2008 | Wise | H04W 8/245 455/403 |
| 2008/0261561 | A1* | 10/2008 | Gehrmann | H04W 12/04 455/411 |
| 2009/0036126 | A1* | 2/2009 | Morikuni | H04W 12/08 455/435.2 |

(Continued)

OTHER PUBLICATIONS

"Embedded SIM Remote Provisioning Architecture", Published on: Dec. 17, 2013, Available at: http://www.gsma.com/connectedliving/wp-content/uploads/2014/01/1.-GSMA-Embedded-SIM-Remote-Provisioning-Architecture-Version-1.1.pdf.

(Continued)

*Primary Examiner* — Eleni Shiferaw
*Assistant Examiner* — Nelson Giddins

(57) ABSTRACT

An electronic device with a network subscription is provided. The device comprises an embedded secure element including a subscription identification code for identifying the subscriber, a unique public first device identification code and a unique second device identification code linked to the first code. The embedded secure element is one of a physical and virtual secure element, and the second device identification code can be read with external reader equipment when the device is disconnected from the network. Methods of transferring a network subscription and identifying an electronic device are also provided.

20 Claims, 3 Drawing Sheets

(56) References Cited

U.S. PATENT DOCUMENTS

| | | | |
|---|---|---|---|
| 2009/0037207 A1* | 2/2009 | Farah | G06Q 10/103 705/301 |
| 2009/0279682 A1* | 11/2009 | Strandell | H04L 63/18 379/201.02 |
| 2012/0168517 A1 | 7/2012 | Lee | |
| 2012/0329396 A1* | 12/2012 | Matsushita | H04W 76/025 455/41.2 |
| 2013/0217361 A1* | 8/2013 | Mohammed | H04W 12/06 455/411 |
| 2013/0227656 A1* | 8/2013 | Holtmanns | H04L 63/0892 726/4 |
| 2013/0316672 A1* | 11/2013 | Nousiainen | H04W 4/001 455/406 |
| 2013/0337743 A1* | 12/2013 | Holtmanns | H04W 76/02 455/39 |
| 2013/0340044 A1* | 12/2013 | Litvin | G06F 21/41 726/4 |
| 2014/0004827 A1* | 1/2014 | O'Leary | H04W 8/22 455/411 |
| 2014/0006786 A1 | 1/2014 | Campagna et al. | |
| 2014/0066011 A1* | 3/2014 | Bradley | H04W 8/205 455/410 |
| 2014/0143534 A1* | 5/2014 | Chastain | H04L 63/0428 713/150 |
| 2014/0188738 A1* | 7/2014 | Huxham | H04L 63/10 705/73 |
| 2015/0017950 A1* | 1/2015 | Zhao | H04W 12/04 455/411 |
| 2015/0189494 A1* | 7/2015 | Idsinga | H04M 1/72577 455/411 |
| 2015/0237496 A1* | 8/2015 | Gao | H04W 8/205 455/414.1 |
| 2015/0296373 A1* | 10/2015 | Morejon | H04W 8/265 455/419 |
| 2015/0365817 A1* | 12/2015 | Chu | H04W 8/183 455/41.2 |
| 2016/0088465 A1* | 3/2016 | Golla | H04W 72/0493 455/450 |
| 2016/0094930 A1* | 3/2016 | Ramanna | H04W 8/205 455/558 |
| 2016/0150400 A1* | 5/2016 | Cha | H04W 76/023 455/418 |
| 2016/0164883 A1* | 6/2016 | Li | H04W 4/008 726/7 |
| 2016/0205550 A1* | 7/2016 | Rajadurai | H04W 48/12 455/411 |
| 2016/0210578 A1* | 7/2016 | Raleigh | G06Q 10/06375 |
| 2016/0242032 A1* | 8/2016 | De Kievit | H04L 9/088 |

OTHER PUBLICATIONS

"Benefits Analysis of GSMA Embedded SIM Specification on the Mobile Enabled M2M Industry", Published on: Sep. 2014, Available at: http://www.gsma.com/newsroom/wp-content/uploads/BRL-Benefits-Analysis-GSMA-Embedded-SIM-Specification-2014.pdf.

Elenkov, Nikolay, "Accessing the embedded secure element in Android 4.x", Published on: Aug. 22, 2012, Available at: http://nelenkov.blogspot.in/2012/08/accessing-embedded-secure-element-in.html.

"Mobile Industry Leaders Kick Start Drive for More Connected Devices", Published on: Nov. 4, 2011, Available at: http://www.gemalto.com/press/Pages/news_1112.aspx.

Zhou, et al., "On the Need of Physical Security for Small Embedded Devices: a Case Study with COMP128-1 Implementations in SIM Cards", In Proceedings of 17th Financial Cryptography, Apr. 1, 2013, 9 pages.

"EUICC, A Disruption in the SIM Market", Published on: Dec. 14, 2012, Available at: http://m2mworldnews.com/2012/12/14/euicc-a-disruption-in-the-sim-market/.

Ziegler, Chris, "Embedded SIMs: they're happening, and Apple thinks they could be in consumer products", Published on: Jun. 1, 2012, Available at: http://www.theverge.com/2012/6/1/3057577/etsi-euicc-embedded-sim-apple.

"Mobile Devices and Identity Applications", Published on: Sep. 2012, Available at: http://www.smartcardalliance.org/resources/pdf/mobile_identity_brief_082712.pdf.

Inside Secure, "Secure Your Embedded Devices using AT90SC/SO and VaultIC", Apr. 2011, p. 1-22, https://docmh.com/secure-your-embedded-devices-using-at90sc-so-and-vaultic-pdf.

* cited by examiner

DEVICE WITH EMBEDDED NETWORK SUBSCRIPTION AND METHODS

BACKGROUND

In non-removable universal integrated circuit card (UICC) ecosystems, a handset manufacturer should have ability to replace and repair end user devices. When the devices are replaced or repaired, the network subscription information may also need to be transferred from an older device to a newer device. Without a physical SIM-card that can be taken out and inserted into another device, the network subscription is transferred by other means, for example via direct connection between the devices.

The embodiments described below are not limited to implementations which solve any or all of the disadvantages of known devices and covers.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

An electronic device and methods are presented. The electronic device has a network connection provided via non-removable secure element with a subscription identification code such as IMSI. The device comprises two unique identification codes linked to each other, wherein the second code is readable for validation by an external reader when the device is switched off. One described method is for transferring a network subscription from a first device to a second, wherein the first device also has a non-removable secure element and is switched off. Another method disclosed is for identifying and potentially validating an electronic device which is e.g. in a power off mode.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
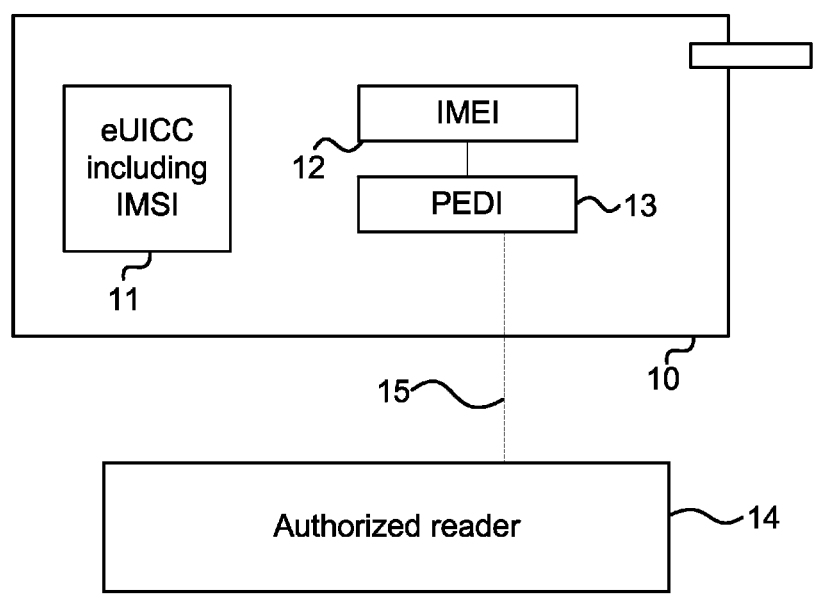
FIG. 1 schematically illustrates an electronic device according to an embodiment.

FIG. 1 shows a device 10 according to an example embodiment. The device 10 is an electronic device with a network subscription which schematically shown by the "antenna" in the top right corner. The device comprises an embedded secure element 11 including a subscription identification code. The embedded secure element 11 may be a physical or virtual secure element. For example, it may be an embedded universal integrated circuit card (eUICC), a software subscriber identification module (software SIM) or any other suitable secure elements. The term "embedded" is used broadly in this specification and covers any non-removable secure elements.

The subscription identification code for identifying a subscriber can be, for example, the international mobile subscriber identity (IMSI) code. This code can be issued by a mobile network operator (MNO) and can normally be validated when the device 10 is connected to the subscription network. In the example embodiment shown on FIG. 1, the secure element 11 is a eUICC including the IMSI code. The device 10 also comprises a unique public first device identification code 12, which may be the international mobile station equipment identity (IMEI) code, or a media access control (MAC) address of a network interface of the device 10. If the device 10 comprises a eUICC as the embedded secure element 11, the unique public first device identification code 12 may be, but is not limited to, the electronic identification (eID) code for the eUICC. The first device identification code 12 can also be any other unique publically available code. The device 10 further comprises a unique second device identification code 13 which is linked to the first device identification code 12. The second code 13 may be linked to the first code 12 in the way it is formed, for example using a cryptographic function having one or more parameters, for example a one-way hash function, wherein at least one of the parameters of the cryptographic function is the first device identification code 12. The second device identification code 13 may be a passive electronic device identifier (PEDI) code which is either calculated or otherwise assigned by an authorizing entity to the device 10. The authorizing entity may be, but is not limited to, the producer or original manufacturer of the device 10. This allows the second code 13 to be calculated, assigned and validated by the same authorizing entity which provides further security in case the device needs to be validated e.g. for network subscription transfer or blocking of personal data access.

The second device identification code 13 is readable with external reader equipment 14 when the device 10 is in a disconnected from the network. This includes any situation in which the device 10 is disconnected. For example, device 10 may be in a power off mode or broken. The external reader 14 may be electronic or optical equipment. For example, the reader 14 may be a quick response (QR) code reader or a near field communication (NFC) reader, in which case the second device identification code 13 may be implemented as a QR code or an NFC chip. This allows for simple and reliable reading of the second device identification code 13 without using the network connection or the power of the device 10, i.e. including the situations when the device 10 is disconnected, switched off or does not work. The external reader equipment 14 may also be authorized by the authorizing entity. The schematic connection 15 between the reader equipment 14 and the second code 13 shows that second code 13 is readable regardless of the state of the device 10. The first device identification code 12 may also be readable by the reader equipment 14.

The electronic device 10 described above may be used in a system which includes the device 10, an authorized service point comprising the reader equipment 14, the authorizing entity such as the OEM connected with the authorized service point, and a mobile network operator. In this system, even if the device 10 is disconnected from the network, for example in a power off mode, the identification codes 12, 13 of the device can still be read and securely validated, and the subscription may be changed directly through the network operator, ensuring that it is no longer running on an "old" device 10 if the subscription is transferred to a "new" device. All user data may also be erased or blocked immediately when the device is powered back on.

Figure 2:
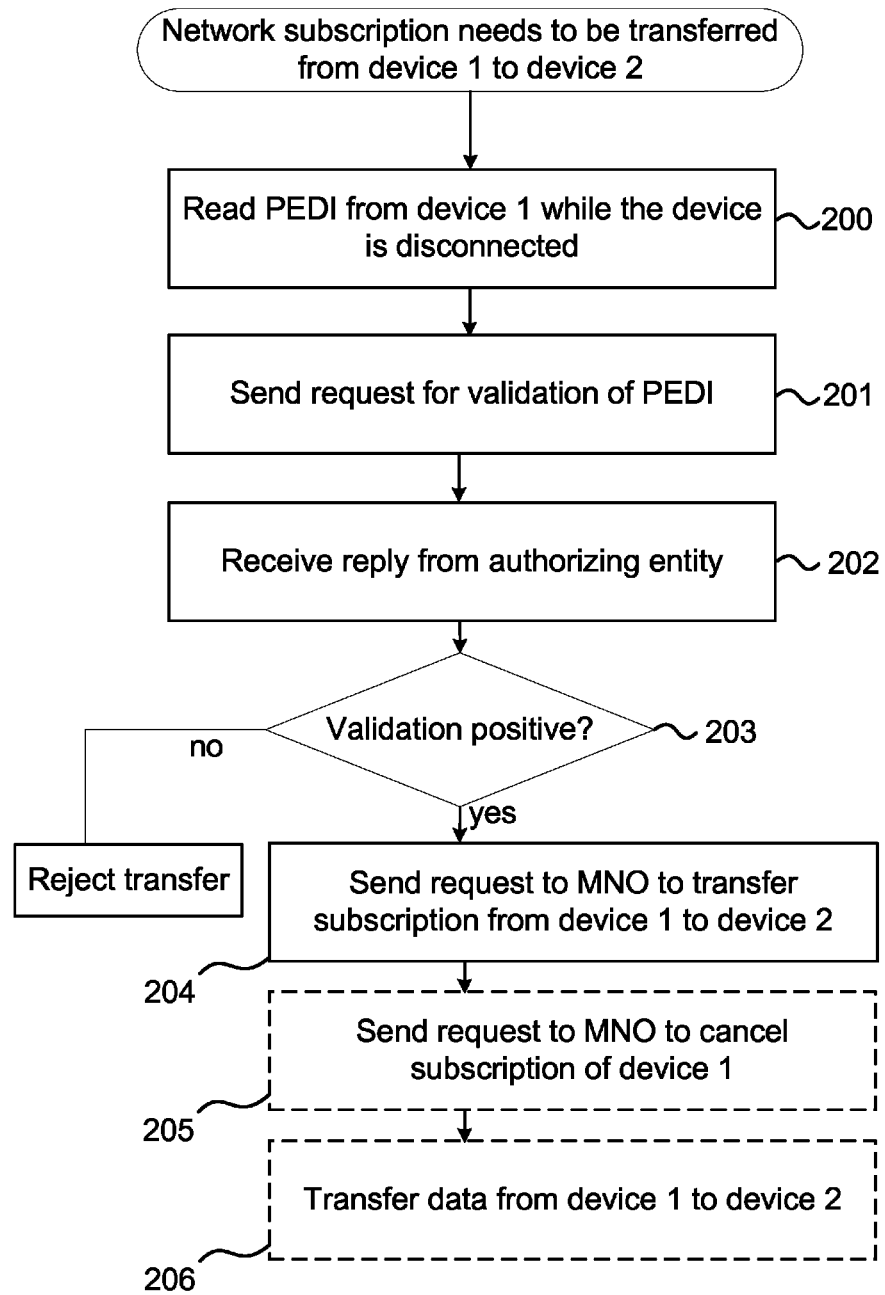
FIG. 2 is an example flow diagram of a method for transferring a network subscription.

FIG. 2 shows a method of transferring a network subscription from a first electronic device (device 1) to a second electronic device (device 2) according to an embodiment. Both devices 1 and 2 can have any kind of embedded secure element, such as a eUICC or software SIM element, and the method provides subscription transfer for this kind of devices. At least the first of the two devices may be a device as described earlier with reference to FIG. 1. The first device comprises: an embedded secure element including a subscription identification code assigned by a network operator, a unique public first device identification code, and a unique second device identification code assigned by an authorizing entity.

The method shown on FIG. 2 can be performed, for example, by an authorized entity such as a service point, repair shop or any other party authorized to request validation of the second device identification code. The method starts with 200 reading the second device identification code, for example the PEDI code, from device 1 with external reader equipment while the device is off. The reading may be performed, for example, by at least one of: optical scanning and near-field communication. Once the code is read, at 201 a request for validation of the second device identification code is sent to the authorizing entity which can perform the validation. The request may comprise data such as the first device identification code, IMEI code, IMSI code or other device identification information. A positive or negative reply is then received at 202 from the authorizing authority, meaning that the validation may be positive or negative 203. If the validation is negative, transfer of network subscription is rejected or cancelled. If the validation is positive, a request is sent to the mobile network operator (MNO) to transfer the network subscription to device 2, as shown at 204. In the optional 205, the request to MNO may also include instructions to cancel the subscription of device 1, or this may be a separate request. Optional parts of methods shown on the Figures are illustrated by dashed outlines. Also optionally, data may be transferred from device 1 to device 2 at 206. The data transfer may be initiated when the first device is back in a "power on" mode, or when the second device is connected to the network, for example by downloading backup of the first device from a cloud.

The method may also comprise notifying the authorizing entity of the subscription transfer and data transfer if it was performed.

According to an embodiment, a method of blocking a network subscription in an electronic device when the electronic device is in disconnected from the network. The device may be like the device 10 described with reference to FIG. 1. The electronic device comprises: an embedded secure element including a subscription identification code assigned by a network operator, a first public unique device identification code, and a second unique device identification code assigned by an authorizing entity.

The method starts similarly to the method described with reference to FIG. 2 with reading the second device identification code from the electronic device with external reader equipment (such as a QR code or NFC tag reader). The method also includes sending a request for validation of the second device identification code to the authorizing entity which can perform the validation. The request may comprise the first device identification code, IMEI code, IMSI code or other device identification information. A positive or negative validation is then received from the authorizing authority. In case the validation is positive, a request may be sent to the network operator to block the network subscription in the electronic device.

The method may also comprise blocking access to user data on the electronic device when the electronic device returns to a power on mode, and notifying the authorizing entity of the blocked network subscription and access to user data and personal communication services such as email or social media applications.

This method may be used, for example, to block the subscription and personal data temporarily or permanently, e.g. if a device is broken and needs to be repaired at a service point.

Figure 3:
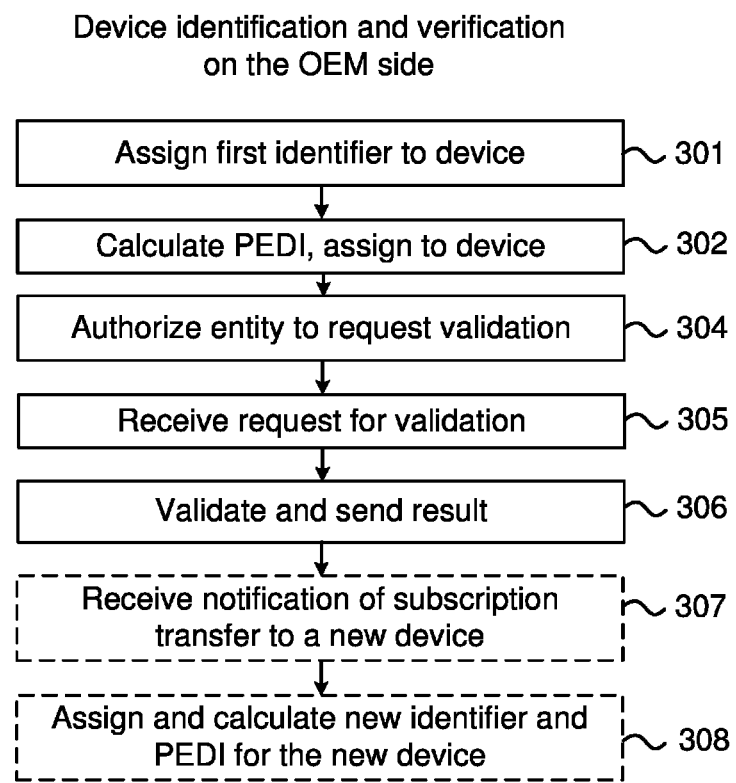
FIG. 3 an example flow diagram of a method for identifying a device.

FIG. 3 shows a method of identifying an electronic device according to an embodiment. This method may also be a method for device validation and may be performed by the authorizing entity, for example the OEM. The electronic device comprises: a virtual or physical embedded secure element including a subscription identification code assigned by a network operator. A public unique first device identification code is assigned to the device at 301. A unique second device identification code based on the first device identification code is then calculated at 302, and it is assigned to the electronic device so that the second device identification code can be read by external reader equipment when the electronic device is disconnected from the network, and possibly switched off. The calculation of the second identification code can be done using a cryptographic function having one or more parameters, for example a one-way hash function, wherein at least one of the parameters identifies the electronic device. In an embodiment, one of the parameters of the cryptographic function is the first device identification code.

An entity is authorized to request validation at 304, wherein the entity may be, for example, a trusted service point with suitable reader equipment. Validation requests that are sent by the authorized entity can include information identifying the electronic device as parameters. For example, the request may include the unique first and second device identification codes. When a request for validation of the second device identification code is received from the authorized entity at 305, the validation is performed and results sent at 306. In an embodiment, the validation may comprise: calculating a third device identification code using the same cryptographic function on the received one or more parameters, for example on the first device identification code; and comparing the resulting calculated third device identification code with the received second device identification code. Alternatively, the received parameters may be compared to a database. When the validation is complete, results are sent back at 306 to the authorized entity.

Optionally, the method may comprise receiving a notification of network subscription transfer from the electronic device to a second electronic device at 307. The method then also comprises assigning a public unique third device identification code to the second electronic device; calculating a unique fourth device identification code based on the third device identification code, for example using the one way hash function algorithm; and assigning the fourth device identification code to the second electronic device so that the fourth device identification code can be read by external reader equipment when the second electronic device is disconnected from the network (e.g. in a power off mode)—incorporated in box 308.

The methods above can provide an effect of secure and reliable validation of a device that is switched off or does not work, which can be used for various tasks such as the ones described above including network subscription transfer to another device, temporary "freezing" of the subscription, blocking access to the electronic device once it is back on, and others.

According to an aspect, an electronic device with a network subscription is provided. The device comprises: an embedded secure element including a subscription identification code for identifying the subscriber, a unique public first device identification code, and a unique second device identification code linked to the first device identification code. The embedded secure element is one of: a physical and virtual secure element, and the second device identification code can be read with external reader equipment when the device is disconnected from the network.

In an embodiment, the second device identification code is adapted to be read by at least one of: optical reading equipment and electronic reading equipment.

In an embodiment the first device identification code is the international mobile station equipment identity code (IMEI).

According to an embodiment, the second device identification code is formed using a cryptographic function having one or more parameters, and wherein at least one of the parameters of the cryptographic function is the first device identification code, thereby linking the first and second device identification codes.

In an embodiment, the first public device identification code can be read with external reader equipment when the device is disconnected from the network.

In an embodiment, the first and second device identification codes are assigned and can be validated by an authorizing entity.

In an embodiment, the authorizing entity is the original equipment manufacturer.

In an embodiment, the embedded secure element is an embedded universal integrated circuit card.

According to an aspect, a method of transferring a network subscription from a first electronic device to a second electronic device when the first electronic device is disconnected from the network is provided. The first electronic device comprises: an embedded secure element including a subscription identification code assigned by a network operator, a unique public first device identification code, and a unique second device identification code assigned by an authorizing entity. And the method itself comprises: reading the second device identification code from the first electronic device with external reader equipment, sending a request for validation of the second device identification code to the authorizing entity, receiving a positive or negative validation from the authorizing entity, and in response to a positive validation, sending a request to the network operator to transfer the network subscription to the second electronic device.

In an embodiment, the method further comprises sending a request to the network operator to cancel the network subscription of the first electronic device.

In an embodiment, the method further comprises transferring user data to the second electronic device, and removing the user data from the first electronic device when the first electronic device returns to a power on mode.

In an embodiment, the method further comprises notifying the authorizing entity of the subscription transfer.

In an embodiment, reading the second device identification code from the first electronic device with external reader equipment is performed by at least one of: optical scanning and near-field communication.

In an embodiment, the method further comprises initiating backup data recovery when the first electronic device returns to a power on mode Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An electronic device with a network subscription, the electronic device comprising:
   an embedded secure element, implemented on a hardware processor of the electronic device, including a subscription identification code for identifying a subscriber associated with the network subscription of the electronic device;
   a first device identification code, wherein the first device identification code is a unique, publicly available code; and
   a second device identification code linked to the first device identification code, the second device identification code calculated and assigned to the electronic device by an authorizing entity, the authorizing entity validating external reader equipment in response to a request from the external reader equipment to read the second device identification code, the second device identification code configured to be read via the validated external reader equipment regardless of a state of the electronic device to transfer the network subscription to another device, and wherein the embedded secure element is one of a physical or virtual secure element.

2. The electronic device of claim 1, wherein the external reader equipment comprises at least one of an optical reading equipment or an electronic reading equipment.

3. The electronic device of claim 1, wherein the first device identification code is an international mobile station equipment identity code.

4. The electronic device of claim 1, wherein the second device identification code is formed using a cryptographic function having one or more parameters, and wherein at least one of the one or more parameters of the cryptographic function is the first device identification code, thereby linking the first device identification code and the second device identification code.

5. The electronic device of claim 1, wherein the first device identification code is a media access control address of a network interface of the electronic device.

6. The electronic device of claim 1, wherein all user data is erased or blocked responsive to the electronic device powering on after the validated external reader equipment reads the second device identification code to transfer the network subscription to the other device.

7. The electronic device of claim 1, wherein the authorizing entity is the original equipment manufacturer.

8. The electronic device of claim 1, wherein the embedded secure element is an embedded universal integrated circuit card.

9. A method of transferring a network subscription from a first electronic device to a second electronic device:
reading a unique device identification code assigned by an authorizing entity from the first electronic device with validated external reader equipment regardless of a state of the first electronic device, wherein the first electronic device comprises an embedded secure element including a subscription identification code assigned by a network operator and a unique public device identification code, and wherein the unique device identification code assigned by the authorizing entity is generated using a one-way hash function and the unique public device identification code, and wherein the validated external reader equipment is validated by the authorizing entity;
sending a request for validation of the unique device identification code read from the first electronic device by the validated external reader equipment to the authorizing entity;
receiving a positive or negative validation from the authorizing entity; and
in response to receiving the positive validation, sending a request to the network operator to block the network subscription and access to personal data on the first electronic device temporarily or permanently.

10. The method of claim 9, further comprising:
in response to receiving the positive validation from the authorizing entity, sending a request to the network operator to cancel the network subscription of the first electronic device.

11. The method of claim 9, further comprising:
in response to receiving the positive validation from the authorizing entity, transferring user data associated with the first electronic device to the second electronic device; and removing user data from the first electronic device responsive to the first electronic device returning to a power on mode.

12. The method of claim 9, further comprising:
notifying the authorizing entity of the subscription transfer.

13. The method of claim 9, further comprising:
in response to receiving the negative validation from the authorizing entity, maintaining the network subscription at the first electronic device.

14. The method of claim 9, further comprising:
initiating backup data recovery responsive to the first electronic device returning to a power on mode.

15. A method of providing a transferable network subscription for an electronic device the method comprising:
assigning a first device identification code to the electronic device, wherein the first device identification code is a unique, publicly available code;
calculating a second device identification code for the electronic device based on the first device identification code;
authorizing external reader equipment to read the second device identification code and request validation of the second device identification code for transfer of the network subscription to another electronic device;
configuring the second device identification code to be read from the electronic device by the authorized external reader equipment regardless of a state of the electronic device;
receiving a request for the validation of the second device identification code from the authorized external reader equipment;
validating the second device identification code;
sending a positive or negative validation to the authorized external reader equipment, thereby approving or rejecting a network subscription transfer request for transfer of the network subscription from the electronic device to the other electronic device; and
responsive to sending the positive validation, transmitting a request to block the network subscription and access to personal data on the electronic device.

16. The method of claim 15, wherein calculating the second device identification code based on the first device identification code comprises using a cryptographic function having one or more parameters.

17. The method of claim 16, wherein one of the one or more parameters of the cryptographic function is the first device identification code.

18. The method of claim 16, wherein the request for validation of the second device identification code includes one or more parameters, and wherein validating the second device identification code comprises:
calculating a third device identification code using the same cryptographic function on the received one or more parameters; and
comparing the calculated third device identification code with the received second device identification code.

19. The method of claim 17, wherein the request for validation of the second device identification code includes the first device identification code, and wherein validating the second device identification code comprises:
calculating a third device identification code using the same cryptographic function having the received first device identification code as one of the parameters of the cryptographic function; and
comparing the calculated third device identification code with the received second device identification code.

20. The method of claim 15, further comprising:
receiving a notification of network subscription transfer from the electronic device to the other electronic device;
assigning a public unique third device identification code to the other electronic device;
calculating a unique fourth device identification code based on the assigned public unique third device identification code; and
assigning the unique fourth device identification code to the other electronic device so that the unique fourth device identification code is configured to be read by the authorized external reader equipment regardless of a state of the other electronic device.

* * * * *